Oct. 30, 1951  E. W. HAILSTON ET AL  2,573,565
WOOD CHECKERING APPARATUS

Filed Aug. 24, 1946  9 Sheets-Sheet 1

INVENTOR
ELLIS W. HAILSTON
CLIFFORD F. CASEY
BY GEORGE R. MELICK

ATTORNEY

Oct. 30, 1951     E. W. HAILSTON ET AL     2,573,565
WOOD CHECKERING APPARATUS Filed Aug. 24, 1946     9 Sheets-Sheet 9

INVENTOR
ELLIS W. HAILSTON
CLIFFORD F. CASEY
BY GEORGE R. MELICK
ATTORNEY

Patented Oct. 30, 1951

2,573,565

UNITED STATES PATENT OFFICE 2,573,565

WOOD CHECKERING APPARATUS

Ellis W. Hailston, Ilion, N. Y., and Clifford F. Casey, Stratford, and George R. Melick, Southport, Conn., assignors to Remington Arms Company, Inc., Bridgeport, Conn., a corporation of Delaware Application August 24, 1946, Serial No. 692,768

12 Claims. (Cl. 144—144)

1

This invention relates to a woodworking machine and to a method which may be practiced with that machine. It has particular reference to a machine and method for forming a checkered pattern on wooden articles of irregular contour such as gun stocks.

To add to security in holding and to improve the appearance, the stocks of high-grade firearms are always provided with a checkered pattern in the regions grasped by the hands. Traditionally, these patterns have been cut by hand and consist of two sets of parallel line patterns, each occupying the entire area to be checkered and overlaid on each other so that the lines intersect at an acute angle. The cuts defining each line are of V-shaped cross-section and when overlapped the surface is found to be covered by a series of closely spaced pyramidical diamonds. The pattern is usually outlined by one or more parallel lines defining the extremities of the intersecting lines. The irregular shape of the small or pistol grip section of the conventional firearm stock has provided a serious problem in developing machines capable of forming this pattern.

It is therefore the major object of this invention to provide a machine and a method capable of economically and expeditiously checkering gun stock blanks.

It is a further object of this invention to improve the appearance of checkered gun stocks by the provision of a checkering machine which will operate accurately and consistently and which is to the least possible extent dependent upon the human factor.

High-grade checkering by hand methods consumes a great deal of time, requires great skill, and those persons capable of doing such work demand relatively high compensation. The provision of a machine for checkering stocks which may be operated at high output levels by relatively unskilled personnel is an additional object of this invention.

These objects may be accomplished by securing the stock in a suitable work-holder which may be so mounted as to cause the grip portion of the stock to be drawn between suitable springpressed cutters. Suitable means are provided to lift the cutters away from the work at the extremities of the pattern and to index the stock by an amount corresponding to the line spacing after each passage between the cutters. When one series of lines has completely covered the desired pattern, the work-holder is shifted angularly to the desired angle which may be, for example, 30°, and the second series of lines run in by following essentially the same procedure.

The exact nature of the invention as well as other objects and advantages thereof will become apparent from consideration of the description relating to the drawings in which.

General description

Figure 1:
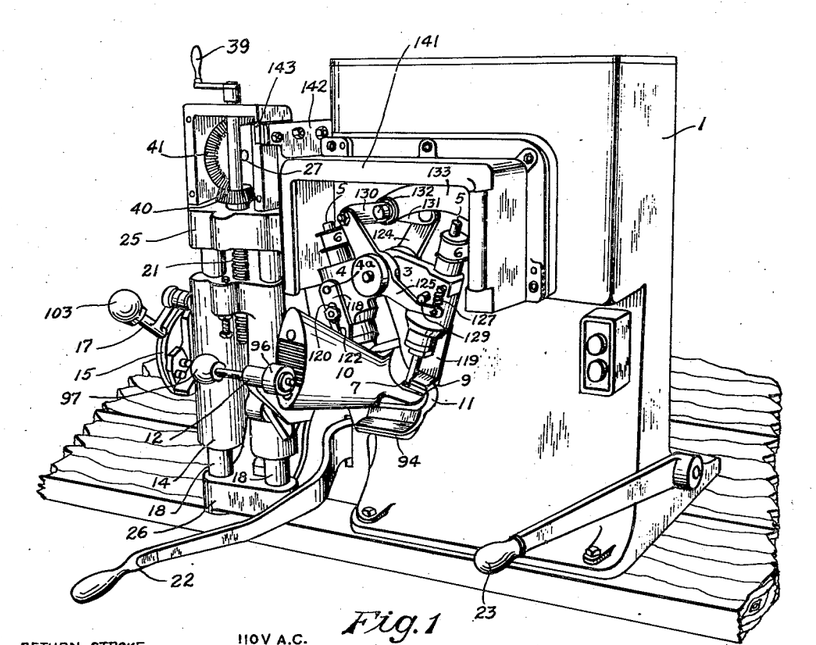
Fig. 1 is a perspective view of the machine as a whole with a workpiece in position, certain covers having been omitted for clarity in illustration.
Figure 2:
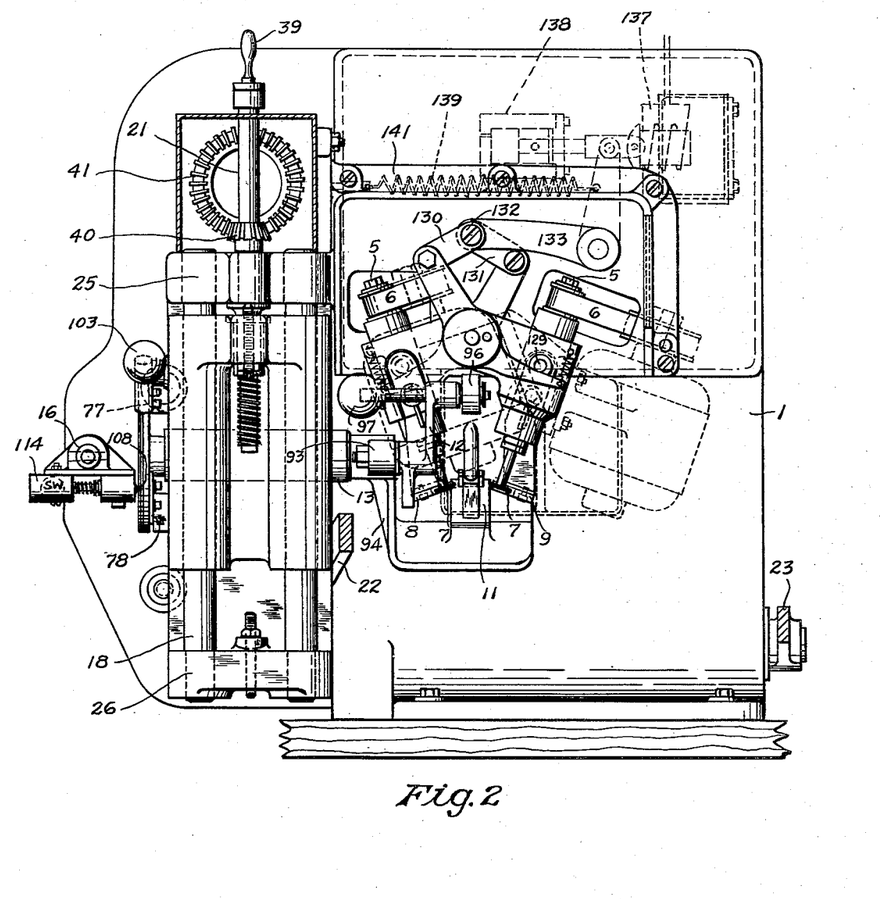
Fig. 2 is a front elevational view of the machine without the workpiece.
Figure 3:
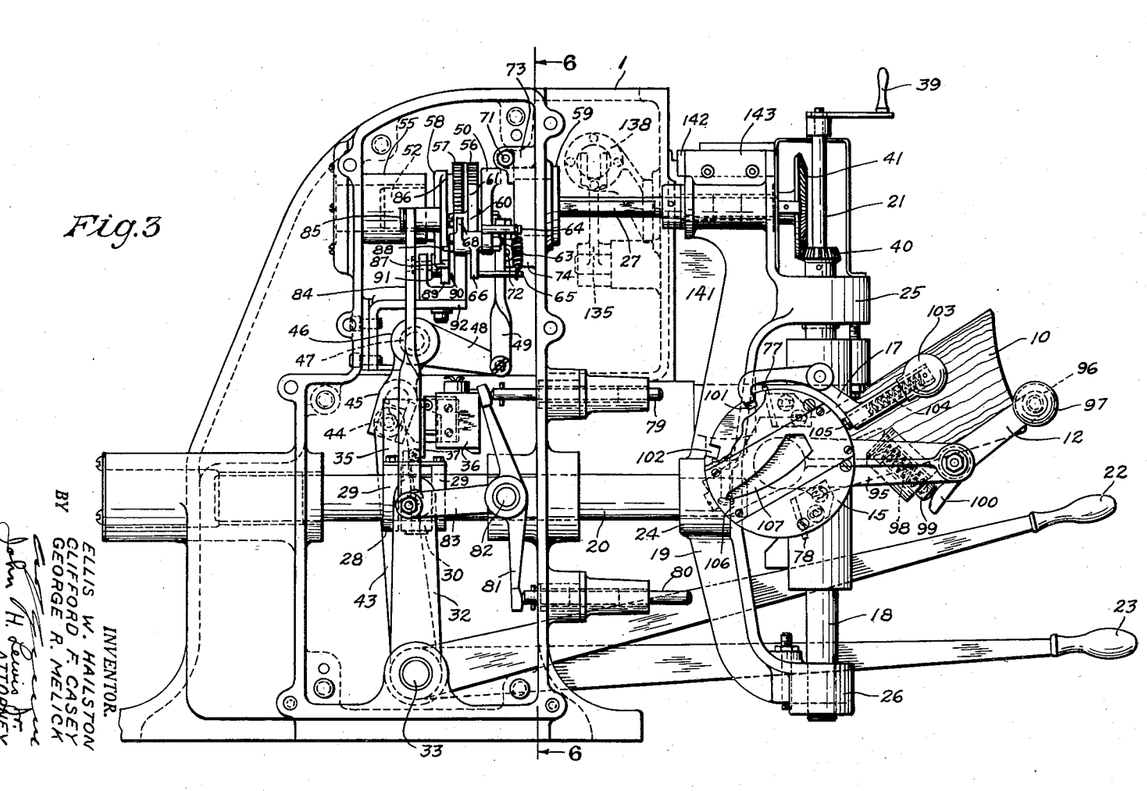
Fig. 3 is a left side elevational view of the machine with the workpiece in place, the pattern control switch and its bracket having been omitted to clarify the showing of the elements behind them.

Referring to the drawings, and particularly to Figs. 1, 2, and 3 by characters of reference, it will be seen that the machine comprises a main frame or housing 1 which has projecting from its forward face a horizontal arbor 2 on which brackets 3 and 4 are pivotally mounted. Each of these brackets supports a spindle 5, driven at high speed by belts 6, and each is provided at its lower end with a cutter 7 adapted to cut a fine line of V-shaped cross-section. Work-engaging followers 8 and 9, not unlike the presser foot of a sewing machine, are mounted on each bracket in adjustable relation as will be later described, and serve by engagement with the work on either side of the cutter to limit the depth of cut. Spring and linkage means also to be described later apply a yielding force tending to draw the two cutters closer to each other and at appropriate times to spread them to an extent preventing their contact with any part of the work.

The workpiece or stock 10 is held in a fitting 11 by means of a clamp 12 which engages the butt plate and is so positioned that a plane halving the stock longitudinally will include the arbor on which the cutters are hung and will be midway between the cutters. The fitting 11 is supported on a transversely extending shaft 13 which is journaled in a vertically movable indexing frame block 14. The end of shaft 13 opposite the fitting 11 carries a template holder 15 which supports a template operating against a fixed pattern follower 16 to control the lifting and releasing of the cutters in a manner to be later described.

A locking lever 17 is provided to hold the transverse shaft in one or the other of two positions rotatably displaced from each other by approximately 30° or any other desired angle.

The indexing frame block 14 is slidably mounted on columns 18 which are supported by the traversing frame 19. The traversing frame is mounted on a reciprocating shaft 20, guided for fore and aft movement in the main frame in a plane parallel to the axis of the cutter supporting arbor 2. A feed screw 21 is engaged between the frame block 14 and the traversing frame 19 by which the vertical position of the frame block may be controlled. An indexing lever 22 operates through linkage which will be described, in the more detailed description to indexably move the frame block by an increment equal to pattern line spacing for each operation of the lever. A traversing lever 23, operates through suitable linkage to cause the traversing frame 19 to be moved forward and back with relation to the main frame.

In general description of the operation of the machine, it may be pointed out that the indexing frame is preferably first positioned near one of its extreme positions and a gun stock blank clamped in place for checkering. Operation of the right-hand lever 23 traverses the stock between the cutters and during the return stroke the lever 22 may be operated to index the stock vertically by an amount equal to the line spacing. During the traversing of the work the template and pattern follower function to allow the cutters to be spring-urged into the work whenever they are within the limits of the defined pattern and cause the separation of the cutters when the cutters are outside the bounds of the pattern and during the return stroke. As soon as all the parallel lines of one series have been cut the stock is swung through the desired angle and locked in the new position by lever 17. By suitable means the direction of indexing is reversed and the pattern gone over again by appropriate operation of the traversing and indexing levers. This second operation completes the checkering by applying a second series of parallel lines intersecting the first at the desired acute angle.

Obviously the manual operation of the levers could be replaced by mechanical, hydraulic, or pneumatic operation with suitable timing to make their operation substantially fully automatic. The detailed description which follows will be subdivided in accordance with the major trains of mechanism contributing to the common result.

Work traversing mechanism

Figure 7:
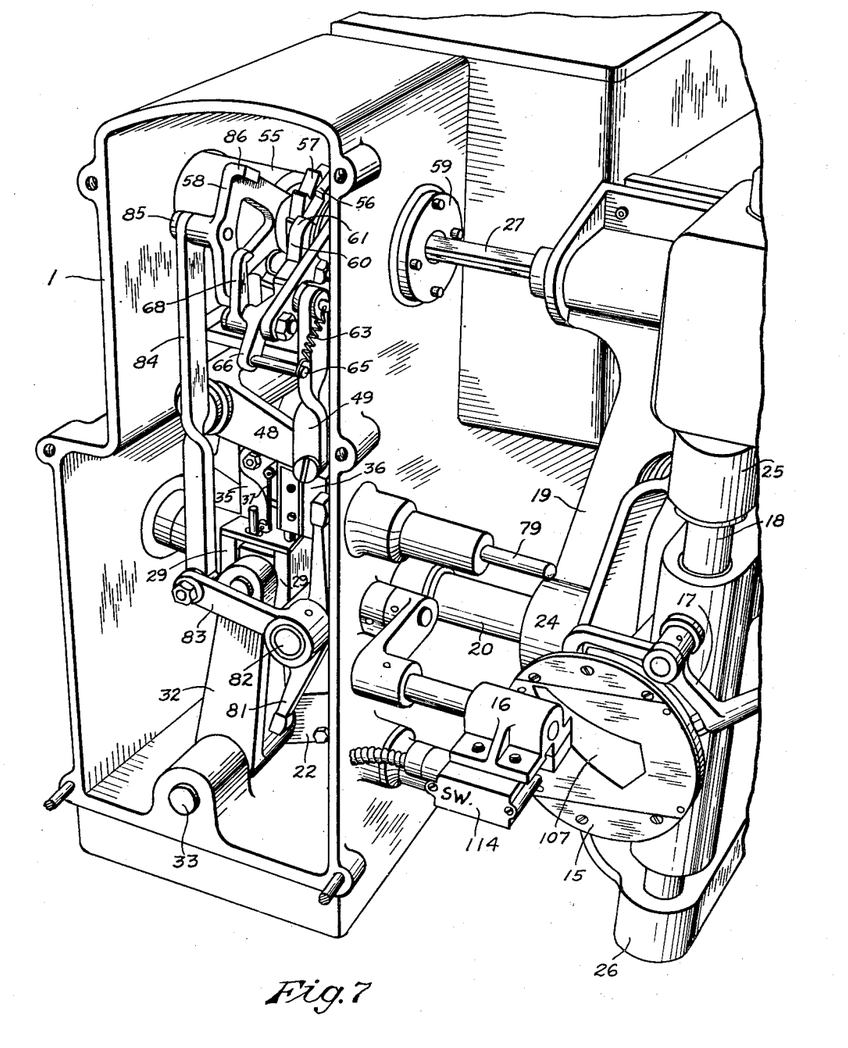
Fig. 7 is a partial perspective view from the left front looking into the portion of the frame housing the indexing mechanism.
Figure 10:
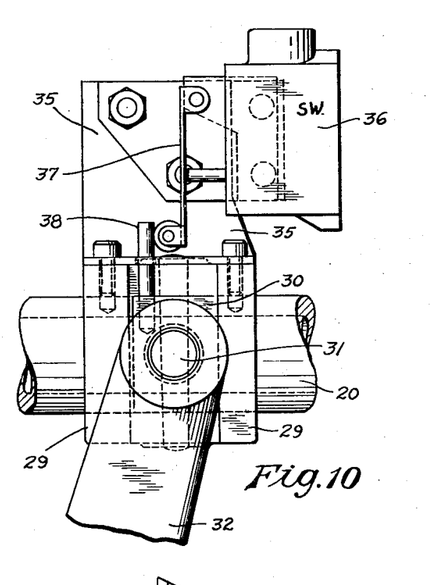
Fig. 10 is an enlarged, partial left side elevation showing the connection of the traversing lever to the reciprocating shaft and the mounting of the return stroke circuit opening switch.
Figure 11:
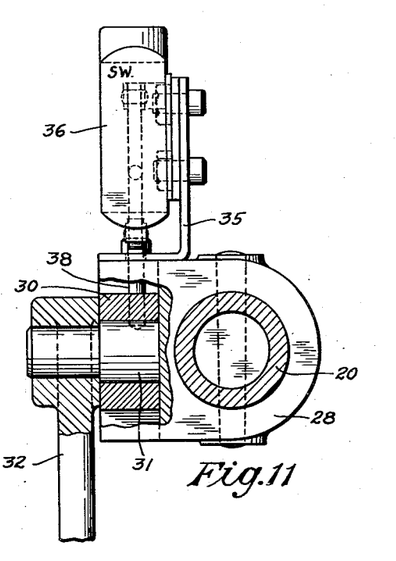
Fig. 11 is an enlarged front elevational view, partially in section showing that portion of the machine included in Fig. 10.

The traversing frame 19 is provided with a boss 24 which provides for attachment of the frame to the reciprocating shaft 20. The frame also provides upper and lower crossheads, respectively 25 and 26, which receive and support the vertical columns 18 on which the indexing block 14 is mounted. The upper portion of the frame 19 is provided with a journal for a shaft 27 which forms a part of the indexing mechanism. Within the confines of the frame 1 the reciprocating shaft 20 has fastened in fixed relation a collar 28 provided with laterally extending spaced arms 29 (Figs. 7, 10 and 11). Loosely received between the arms 29 is a block 30 which is rotatably engaged with a stud 31 mounted in the end of an arm 32. The arm 32 is pinned or otherwise rigidly secured on the cross-shaft 33, journaled in the frame and extending horizontally therethrough. At the remote end of the shaft 33 and outside the frame the traversing lever 23 is secured by some suitable rotation transmitting coupling. Obviously, swinging of the lever will cause reciprocation of the traversing frame between the limits defined by engagement of the front and back of the frame with the collar 28.

A bracket 35 (Figs. 7, 10 and 11) is mounted on the collar 28 and supports a normally closed micro-switch 36 with its actuating arm 37 in position to be engaged by a pin 38 mounted in the block 30 between the arms of the collar. Clearance for the pin 38 is provided in the web of the bracket 35 and the switch is so mounted that only in a position in which the block engages the front arm of the collar to reciprocate the shaft outwardly is the switch held away from its normal closed position. The amount of clearance between the arms of the collar is such that on the inward stroke the switch is allowed to return to its normal closed circuit condition. While the utilization of this switch will be discussed in more detail under the heading "Cutter Control," its purpose is to open the cutter control relay circuit and cause the cutters to be retracted from the work during the outward or return stroke of the traversing frame.

Work indexing mechanism

As previously noted herein, the indexing frame block 14 is slidably received for vertical movement on columns 18 mounted in the traversing frame. A vertical screw 21 is threadably received in the upper web of the block 14 and journaled for rotation in the upper web of the traversing frame but secured therein against the possibility of vertical movement. The upper end of the screw 21 is provided with a crank 39 for manual adjustment and with a bevel gear 40 meshing with the bevel gear 41 on the shaft 27 also journaled in the traversing frame and extending rearwardly therefrom. The shaft 27 is received in slidable relation in a two part transmitting block 42 which engages the squared end of the shaft 27 in such fashion as to prevent relative rotation therebetween.

As previously noted, the indexing of the work is under the control of the indexing lever 22. This lever extends through a slot in the frame and is journaled on the cross-shaft 33 so as to be freely rotatable with respect thereto. Integral with or rigidly fixed to the lever 22 is an upwardly extending arm 43 which has a pin and slot connection 44 with the downwardly extending arm 45 of the bell crank 46, pivotally mounted on an arbor 47 secured to the frame. The forwardly extending arm 48 of the bell crank is pivotally engaged with the lower end of a vertically extending link 49 which, at its upper end, is pivotally connected to the pawl carrier 50. The pawl carrier is provided with a suitable bushing 51 and is thereby supported on hollow shaft 52 for rotation relative thereto. The shaft 52 is rotatably supported in a bushing 53 secured in the front plate of the frame and in a bushing 54 secured in a housing 55 inserted in the back part of the frame. The transmitting blocks 42, previously referred to, have a keyed engagement with the inner front end of the shaft 52 and serve to insure that rotation is transmitted between the shafts 52 and 27 while allowing telescoping longitudinal movement of shaft 27 within the shaft 52.

The ratchet wheels 56 and 57 are provided with oppositely facing teeth and are both keyed or otherwise non-rotatably secured to the hollow shaft 52. Rearward of the ratchet wheel a suitably bushed pawl reversing sector 58 is received on the hollow shaft for rotation relative thereto. A thrust plate 59 is secured to the front face of the frame to retain the shaft 52 and transmitting blocks 42 against endwise movement.

The compound ratchet driving pawl 60 comprises two oppositely directed noses 61 and 62 adapted to coact respectively with ratchet wheels 56 and 57. The compound pawl is pivotally mounted on the pawl carrier 50 in such a fashion that only one nose at a time can engage a ratchet wheel, it being necessary to shift the pawl through a considerable angle on its pivot before the other nose becomes effective.

The compound pawl has one or the other of its noses urged into engagement with a ratchet wheel by spring 63 which is secured to the pawl carrier at 64 and acts at 65 on the compound pawl shifting lever 66, pivotally mounted on the pawl carrier. It will be noted that the line of spring tension will pass through dead center as the lever is shifted so that the spring applies a force which is reversible and may be utilized to urge the lever selectively in either direction. The actual shifting of the lever is accomplished by pawl reversing means to be presently described. The pawl shifting lever is provided with two arms 67 and 68 adapted to coact respectively with radially projecting fingers 69 and 70 which are in turn respectively associated with the pawl noses 61 and 62.

Figures 6, 12, 13:
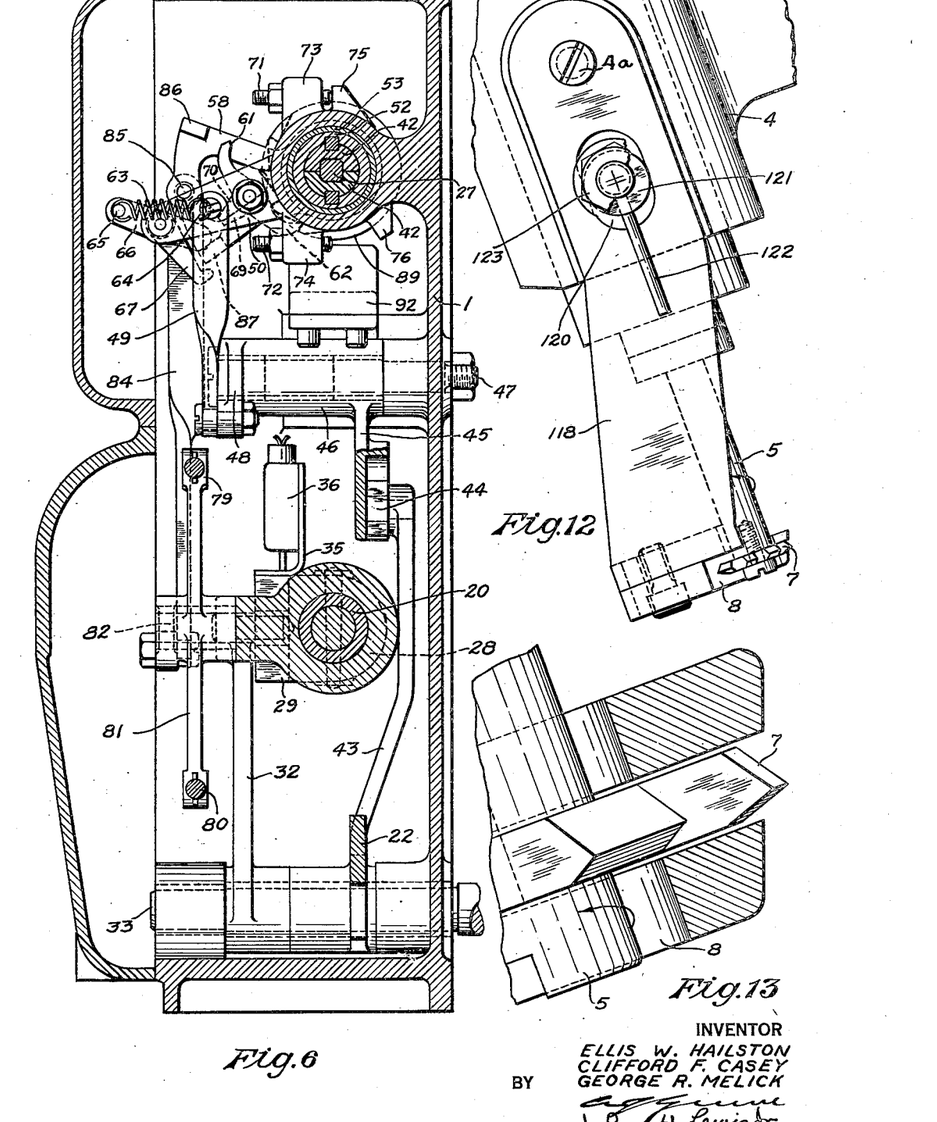
Fig. 6 is a partial vertical sectional view on the vertical plane indicated by the line 6—6 of Fig. 3.
Fig. 12 is an enlarged partial front elevational view detailing the mounting of the cutter spindle and its depth regulating foot.
Fig. 13 is an enlarged view of a portion of Fig. 12, partially in section to show the relation of the cutter teeth to the work which would contact the foot on either side of the cutter.

When, as shown in Fig. 6, the line of spring tension is above the shifting lever pivot, the shifting lever is urged in a clockwise direction and the rear arm 68 thereon engages the top surface of the rear pawl finger 70, urging the compound pawl in an anti-clockwise direction and bringing the rear pawl nose 62 into engagement with the teeth of the rear ratchet wheel 57. Obviously, when the line of spring tension is shifted below its dead center position, the pawl shifting lever will be urged in an anti-clockwise direction, the front arm 67 will engage the lower face of the front finger 69, the pawl will be urged clockwise, and the nose 61 will engage the ratchet wheel 56.

It will be obvious that when the indexing lever 22 is operated through one cycle, the indexing screw shaft will be rotated through one increment of motion. The direction of this increment is determined by the setting of the pawl shifting arm. The limits on the incremental movement are determined by the stop screws 71 and 72 adjustably supported in projections 73 and 74 of the frame and adapted to bear respectively on abutments 75 and 76 on the pawl carrier 50.

*Pawl reversing*

As has been previously noted, the horizontal work supporting shaft 13 carries at its left end a template supporting plate 15 and as also previously noted, this shaft may be rotated through approximately 30° when the indexing frame has arrived at either extremity of its vertical movement. These operations serve as a starting point for the pawl reversing operation.

Secured to the back side of the template holding plate 15 there are two angle brackets 77 and 78 which may respectively engage plungers 79 and 80 slidably mounted in the front face of the frame. The lower bracket 78 is so positioned that when the indexing frame is in its lower position and the work shaft has been rotated in a position to lower the butt end of the stock, it will be directly opposed to the lower plunger 80 and will move the same inwardly when the traversing frame is moved to its rearward position, or if the work shaft is shifted when the traversing frame is in its rearmost position, the rotary movement will swing the bracket against the end of the plunger and move it inwardly. A similar relationship is observed in the positioning of the top bracket 77 with respect to the plunger 79 and at the upper position of the indexing frame the plunger 79 is shifted inwardly if the work shaft is placed in the appropriate position.

Within the frame the plungers 79 and 80 cooperate with opposite ends of a lever 81 pivoted to the frame at 82 and having a rearwardly extending arm 83. A link 84 is engaged between the arm 83 and a pivot 85 on the pawl reversing sector 58. The pawl reversing sector is provided with two abutments 86 and 87 arranged to coact with a shifting pin 88 projecting from the compound pawl shifting lever. When the sector is in its lowermost position as shown in Fig. 6 the upper abutment 86 is in position to engage the shifting pin 88 on an upward movement of the pawl carrier and positively insure that the shifting lever occupies the position in which it is shown and in which it urges the rear pawl nose 62 into engagement with the rear ratchet wheel 57. If the sector is shifted upwardly from the position in which it is shown in Fig. 6, the lower abutment 87 will engage the shifting pin 88 and throwing the spring 63 across dead center, will place pawl nose 61 in engagement with ratchet wheel 56. After shifting, the pin 88 will move idly between the abutments until the sector is again shifted.

To insure that the reversing sector is not shifted inadvertently and that it does not depart from its proper position as a result of machine vibration or other causes, the sector has been provided with a downwardly projecting brake flange 89 arranged to be gripped between brake shoes 90 and 91 adjustably mounted on a bracket 92 secured to the frame.

The operation of the indexing system should be clear from the foregoing but in recapitulation it may be pointed out that starting in a lower position of the indexing frame with the butt of the stock turned down, successive operations of the indexing lever will move the indexing frame up by incremental movements corresponding to the line spacing of the pattern. When the upper extremity of movement is reached, the stock is shifted to its 30° displaced position, which operates the reversing mechanism as just described. Further successive operations of the indexing lever move the indexing frame incrementally downward, in which position shifting of the stock and work supporting fittings again reverses the pawls and readies the machine for another cycle of upward movement.

Work-holder and pattern former

Figure 14:
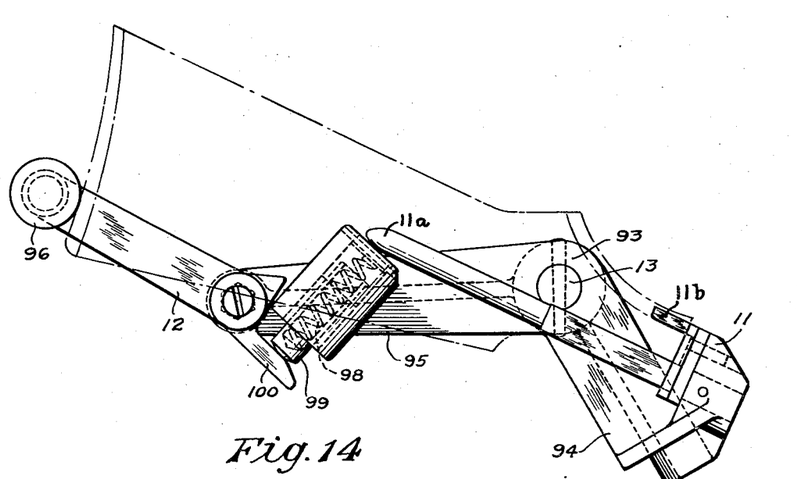
Fig. 14 is an enlarged right side elevational view illustrating the work-holding fixture and clamp therefor, a suitable workpiece being shown in dot and dash lines.

As has been previously noted, the indexing frame provides a journal for the horizontal work supporting shaft 13. On the right-hand end of the shaft there is provided a fitting 93 (Fig. 14) which has a forwardly and downwardly extending arm 94 supporting the fitting 11. The stock supporting fitting 11 is formed in substantially the shape of the stock-engaging portion of the type of firearm receiver or metallic firearm frame member to which the finished stock is to be fitted and enters into the cuts in the stock provided for the reception of the receiver. Extension 11a on the fitting 11 is of the same dimensions as the stock bolt stud of a typical firearm receiver and enters into the bore formed in the stock for the reception of the stud. Extension 11b of the fitting 11 may be formed to match the trigger plate tang of a typical firearm receiver and is similarly received in the clearance cut provided in the stock for receiving the trigger plate tang. The fitting 11, it will be seen, engages the stock by those surfaces through which the stock engages the finished metal work of the firearm and insures the accurate and reproducible location of the checkering relative to those members. A rearwardly extending arm 95 has pivotally mounted thereon a clamping arm 12 which is provided with a roller 96 adapted to engage the butt plate and with a handle 97. A spring 98 is received in a housing on the arm 95 and acts through the plunger 99 upon the toe 100 of the lever arm 12. By this means the stock is securely, but releasably, retained in engagement with the fitting 11 in position to be acted upon by the cutters.

Figures 8, 8A, 9:
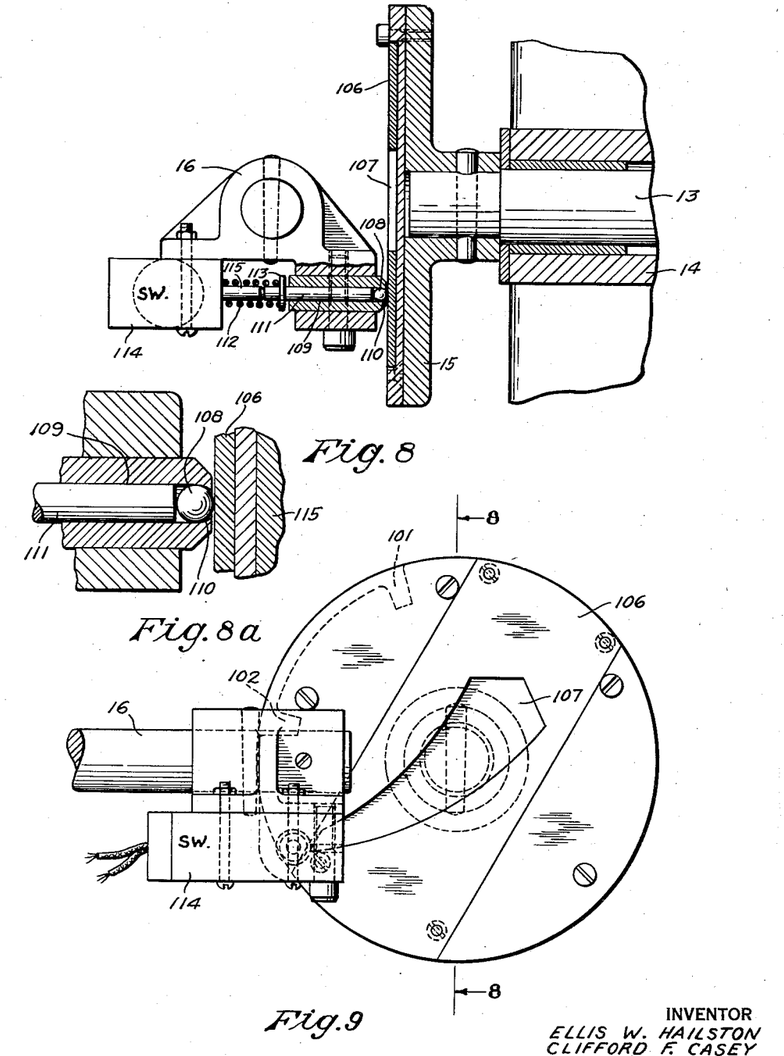
Fig. 8 is a partial, enlarged, vertical sectional view taken on the vertical plane indicated by the line 8—8 in Fig. 9.
Fig. 8a is an enlargement of a small portion of Fig. 8.
Fig. 9 is an enlarged, partial, left side elevation showing the template and related pattern follower.

The left-hand end of the horizontal work supporting shaft as previously noted has mounted thereon the template plate 15 to the back side of which the reversing angle brackets are secured. As best seen in Figs. 3 and 9, the template plate is notched on its periphery at 101 and 102 to receive the toe of the locking lever 17 which is pivotally supported on the indexing frame and provided with a handle 103 and a spring 104 acting through a plunger 105 on the smooth periphery of the template plate. The lever will thus be seen to be releasably spring-urged in the direction retaining it in one or the other of the notches, but may be readily released to permit shifting of the angular position of the work shaft.

The template plate supports on its left hand face an interchangeable template or pattern former 106 which has an aperture 107 cut therein outlining a horizontal projection of the pattern to be checkered on the stock. A variation in the pattern requires only a replacement of the template with one outlining the desired pattern.

Figure 4:
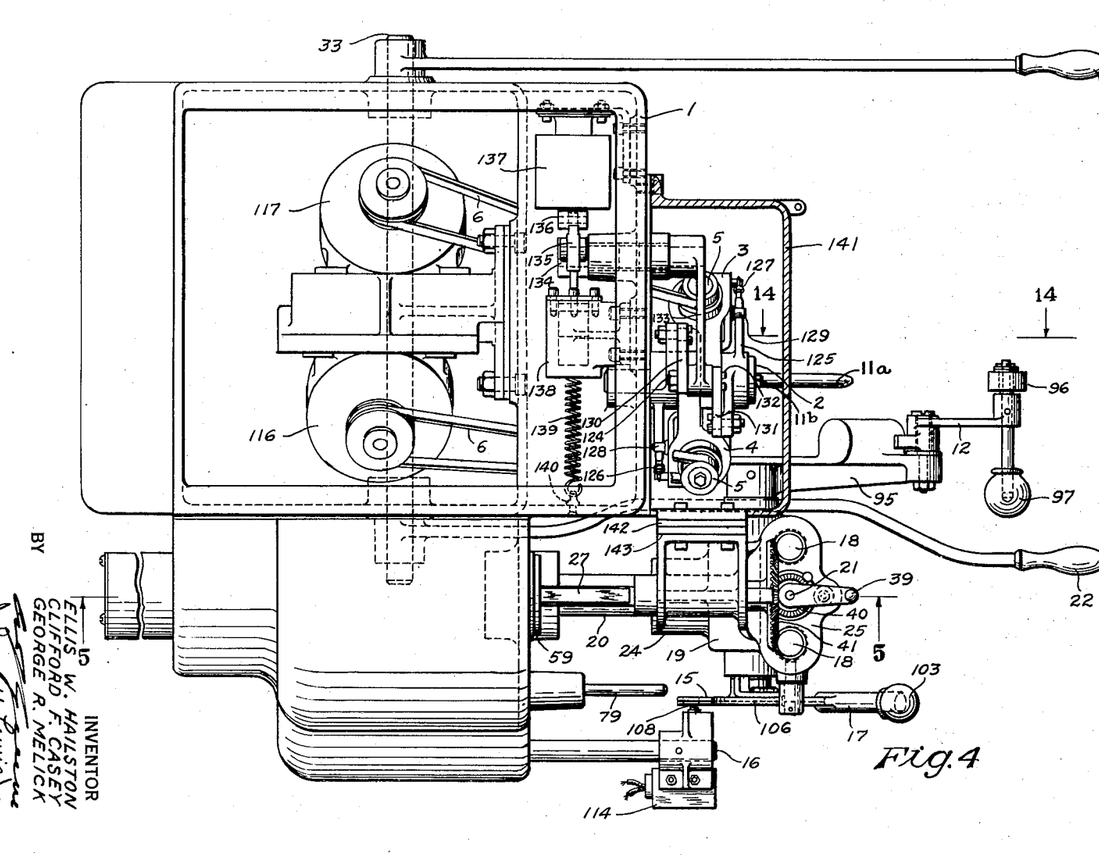
Fig. 4 is a top plan view, certain cover plates and guards either being removed or partially sectioned.
Figure 5:
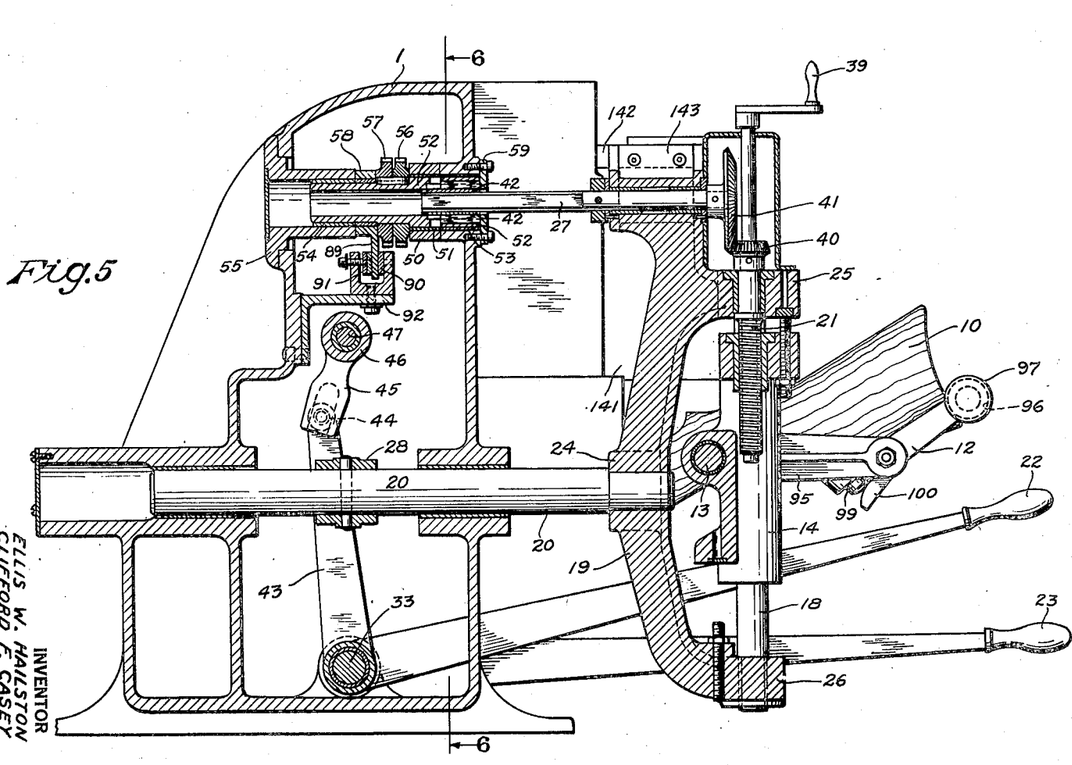
Fig. 5 is a vertical sectional view on the plane 5—5 of Fig. 4.

The template functions to control the limits of the pattern through the pattern follower indicated generally at 16 and supported rigidly by a suitable bracket on the frame of the machine. For clarity in illustration, this assembly has been omitted from Fig. 3 but will be seen detailed in Figs. 8 and 9 and on Figs. 2, 4, and 7. By reference to Fig. 8a, it may be seen that the follower comprises a ball 108 received in a bore 109 for movement longitudinally thereof. The bore 109 is partially closed by lips 110 which limit the protrusion of the ball from the bore. A follower plunger 111 is also slidably received in the bore 109 and is biased into engagement with the ball by a spring 112 engaged between a flange 113 and the body of a short throw precision switch 114 which may be a normally closed switch of the type known as a micro-switch. The switch operating plunger 115 is directly opposed to the follower plunger 111 and is operated by movement thereof.

It will be seen that whenever the ball contacts the face of the template, the ball will be substantially flush with the end of the bore, the plunger will have been moved thereby and the switch plunger moved in to break the circuit through the normally closed switch. As the template is traversed past the follower, the ball will protrude to the limit permitted by lips 110 whenever the aperture in the template is opposed thereto and the switch will be allowed to resume its normally closed position. Since the ball of the pattern follower occupies substantially the same position relative to the projected pattern represented by the template as the cutters do to the actual pattern, it will be seen that a convenient means of cutter control has been provided. The exact manner in which this switch, and that previously described on the traversing mechanism, function to control the cutters will be described in a section entitled "Cutter Control."

Cutter mounting and drive

The cutter arbor 2, as previously noted, projects forwardly from the face of the frame 1. On the cutter arbor there are swingably mounted the two cutter brackets 3 and 4, each of which has received therein a high speed precision cutter spindle 5. The spindles are driven by means of belts 6 from separate motors 116 and 117 housed within the frame. The lower end of each spindle is provided with a cutter wheel 7 as shown in Fig. 12, the shape of the teeth being best shown in the partial enlarged view of Fig. 13. To avoid any tendency toward chipping or splintering, these cutters are preferably arranged for a climbing cut. Each bracket is provided with a follower foot 8 or 9 which engages the surface of the work on either side of the cutter teeth and limits the depth of cut thereof. The arms 118 and 119 (see Fig. 12) respectively supporting the follower feet 8 and 9 are pivotally mounted by pivot screws 3a and 4a on their respective cutter brackets 3 and 4 and are each provided with an elongated slot 120 coacting with an eccentric 121 pivotally mounted in the bracket and rotatably positioned by means of a lever 122. A lock nut 123 permits the maintenance of any desired adjustment. Although Fig. 12 specifically refers to the arrangement of the follower foot on cutter bracket 4 the arrangement is identical on cutter bracket 3 although there positioned on the rear face of the bracket and not readily illustrated. It is important that the cutter spindles and the follower feet be of very rigid construction and entirely capable of maintaining their adjustment to prevent bounce and gouging as the cutters are shifted out and in.

Also pivotally mounted on the cutter arbor 2 are a pair of control levers 124 and 125 which are engaged with the cutter brackets by means of springs 126 and 127. The outer end of each lever is also positioned under a stop pin 128 or 129 which are respectively fixedly positioned on the cutter brackets 4 and 3. The springs 126 and 127 are each engaged between one of the control levers and its associated cutter bracket tending to normally hold the cutter bracket stop pin 128 or 129 in contact with the outer end of the control lever associated with the particular cutter bracket. It will be seen that whenever the upper end of a control lever is brought nearer a vertical plane passing through the cutter arbor, the support of the outer end of the lever will be withdrawn from the stop pin and the spring will be put under increased tension to urge the cutter into the work. Similarly, whenever the upper end of a control lever is forced away from the vertical plane mentioned above, the outer end of the control arm will be raised and by reason of its engagement with the stop pin will positively take the cutter bracket with it, moving the cutter out of engagement with the work.

Symmetrical operation on both cutters is assured by the fact that symmetrical links 130 and 131 are engaged between the upper ends of the respective levers and a common pivot 132 on the end of a bell crank lever 133 journaled in the front plate of the frame. Within the frame, bell crank lever 134 extends upwardly and is coupled to a link 135 between the pull in core 136 of a solenoid 137 and a dash-pot 138 which prevents too abrupt action. A spring 139 anchored to the frame at 140 opposes the solenoid and serves to insure that the cutters are spread away from the work whenever the solenoid is not energized. When the solenoid is energized, its core is pulled in, the bell crank is swung in a clockwise direction and the cutters are urged by springs 126 and 127 into the work. Preferably, all possible units of the cutter shifting system should be made of relatively light metal such as aluminum or magnesium alloys to reduce to a minimum the effects of inertia, which might otherwise be a disturbing factor.

A boxlike housing 141, from which a front closure is shown removed, may be secured to the frame to protect the operator from contact with the belts or spindle operating mechanism as well as to protect those parts from dirt or accidental damage. This housing is utilized as a support for a thrust plate 142 engaging a mating plate 143 on the upper cross-head of the traversing frame. Although these plates are not strictly essential, the traversing system is slightly out of balance in the direction of the stock holding fittings and the provision of the thrust plate takes the load from the indexing shaft.

*Cutter control*

Figure 15:
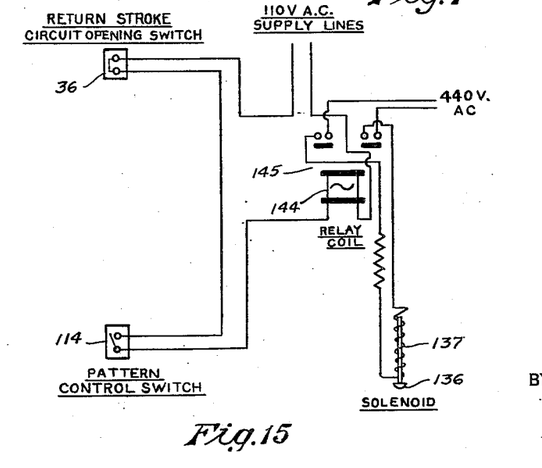
Fig. 15 is a schematic diagram of a portion of the wiring of the machine, such conventional details as motor starting circuits being eliminated.

In considering the control of the cutters, reference should be had to Fig. 15 which shows schematically the wiring involved. As previously pointed out, the traversing system is provided with a normally closed micro-switch 36 which is allowed to assume its normal position and function to complete a circuit only during the inward or working stroke of the traversing system. It has also been previously noted herein that the pattern follower is provided with a normally closed micro-switch 114 which is allowed to assume its normal closed position only when the follower ball is opposed by the recessed portion of the template. These two switches are connected in series with a source of 110 volt A. C. or other convenient power and the coil 144 of a double pole normally open circuit relay 145. Thus, only under the conditions existing when the traversing system is moving on its working stroke and the pattern follower is over the recess in the template will the circuit be closed through the relay coil and the contacts thereof closed. On the return stroke, the pattern control switch will close but the return stroke switch will be held open and the coil will not be energized. When the relay contacts are closed, they complete a circuit from a source of power, which may be the 440 volt A. C. supply to the motors, through the coil of the solenoid 137, drawing in the core thereof, and moving the cutters into engagement with the work. The dashpot serves to prevent too abrupt movement with consequent strain and danger of bouncing or gouging.

It may be noted that under the conditions of operation, there may be some inherent delay due to the time constants of the relay, solenoid, and dashpot. These factors are, however, substantially constant and under the conditions of machine operation the traversing rate is substantially constant. Since the cutting is all done during the inward stroke and since indexing only takes place while at rest or during the outward stroke of the traversing system, the most serious effect of the time constants of the system will be a slight fore and aft displacement of the actual pattern with relation to its horizontal projection on the template. This displacement is an immaterial factor since it is readily compensable by fore and aft adjustment of the pattern follower on its bracket.

It will, however, be appreciated that if the cuts are to start uniformly at the edge of the desired pattern, the cutters must descend consistently and with promptness. In spite of every attempt to cut down the inertia of the moving system, consistent operation may require that a fair amount of force be exerted on the face of the stock as the cutters move in. This is immaterial during the cutting of the first set of lines, but in the cutting of the second set of lines, if the points of impact coincide, there may be a tendency to cut deeper than desirable in this region. The usual stock checkering pattern runs out to a point at the end nearest the receiver, the included angle of this point being the same as that separating the two sets of lines. This feature is a determining factor in the designation of the inward stroke as the working stroke and the outward stroke as the return stroke. When the inward stroke is the working stroke, the initial plunge of all the cuts for one series of lines will be to one side of the point and the initial plunge of all the cuts for the other series of cuts will be to the other side of the point. Thus, there is no coincidence of impacts and no tendency to chip or cut too deeply. In other respects, the direction of the working stroke is immaterial.

*Operation*

In detailed description of the operation of the machine, the various functions and their effect upon the workpiece will be discussed in a sequence which might be utilized in production operations. Obviously, however, since the machine illustrated is manually operated, no hard and fast schedule can be expected and minor variations may be expected as the result of preferences of individual operators.

For most efficient utilization, operations should be commenced with the indexing frame near one or the other of its extreme vertical positions, preferably just beyond the confines of the desired pattern. The stock clamping lever 12 may be shifted downwardly against its spring 98 and a semi-finished stock blank engaged with the fitting 11 in the same relation thereto it would have to a finished receiver or metallic firearm frame with which the particular stock is intended to be used. The roller 96 may then be allowed to engage the butt plate and will thereafter hold the stock firmly on the fitting. If the stock is fitted in with the indexing frame in its lower position, the work shaft 13 should be positioned and locked by the lever 17 so that the butt of the stock is inclined downwardly. To secure a fine adjustment which will place the cutters 7 just outside the area in which they are to start work, the hand crank 39 may be operated to position the lowermost portion of the template aperture 107 immediately above the follower ball 108. Since the machine is usually utilized in repetitively cutting identical patterns on identical workpieces, this is ordinarily the region in which the machine will be stopped and a new workpiece inserted.

With the work shaft locked in butt downward position, the pawl shifting angle bracket 78 will be in position to engage the lower plunger 80, forcing it inwardly and setting the indexing pawl with the proper nose in contact with the ratchet wheel to index the work upwardly. An upward operation of the traversing lever 23 moves the traversing frame and the work inwardly and if still outside the bounds of the desired pattern the cutters remain retracted. During the return operation of the traversing lever, the indexing lever 22 may be operated up and down through one cycle, rotating the screw 21 by one increment and shifting the indexing frame upwardly by an increment equal to the spacing between adjacent lines of the pattern. Further alternate and co-ordinated operation of the two levers results in successive stepwise upward movements of the indexing frame, each such upward movement being followed immediately by an inward traversing of the workpiece in response to the upward movement of the traversing lever 23.

In the pattern zone each upward stroke of the traversing lever corresponds to an inward traversing of the work and allows closing of the return stroke circuit opening switch 36. As soon as the follower ball 108 drops into the template aperture 107 the pattern control switch 114 is allowed to close. These switches complete a circuit through the coil of the relay 145, closing its contacts and completing a circuit through the solenoid 137.

The drawing-in of the solenoid core swings the bell crank lever 133 upwardly, allowing gravity and the force of springs 126 and 127 to feed the cutters into the work, the depth of their cutting being limited by the follower feet 8 and 9.

As the follower ball is cammed inwardly when the edge of the template aperture passes beyond it, the electrical circuit is opened and the sequence of operations referred to above is reversed, the spring 139 providing the motive power for retraction of the cutters.

On the return stroke the ball again drops into the template aperture, but, since the circuit has been broken by the return stroke circuit opening switch 36, the cutters are not drawn into engagement with the work.

By continued operation of the levers the stock will move up by steps until the entire pattern area has been covered by the parallel lines making up half of the pattern. When this condition has been reached, as will be immediately apparent by the completion of a traversing cycle without a cutting operation, the locking lever 17 is released and the stock and work shaft swung through an angle of approximately 30° to a position in which the butt of the stock is upwardly presented.

The shifting of the work shaft brings the upper angle bracket 77 into opposition to the upper reversing plunger 79, in which position the plunger will be shifted inwardly to operate through the lever 83 and link 84 on the pawl shifting sector 58. This operation will bring the upper abutment 86 into engagement with the shifting pin 88 on the pawl shifting lever 66 which will be rotated thereby beyond a dead center position and restrained in the new position by the spring 63. This operation in turn will bring the rear arm 68 of the shifting lever into contact with the upper face of the finger 69 on the compound pawl 60 and will shift it through an angle bringing the rear or lower nose 62 of the pawl into engagement with the rear ratchet wheel 57. In this manner, the indexing mechanism has been condidtioned so that further operation of the indexing lever will move the indexing frame incrementally downward.

The subsequent timed operation of the indexing and traversing levers will result in a repetition of the operation which took place on the upward cycle with only these two differences. The work moves downwardly with respect to the cutters and the work has been angularly displaced by about 30° with the result that the second series of lines intersecting with the first defines a pattern consisting of symmetrical closely spaced diamonds.

Removal of the stock is accomplished quite simply by releasing the clamp 12 and withdrawing the stock longitudinally from the fitting 11. The pattern may then be provided with the usual border by hand-working or other suitable methods.

*General discussion*

It will be obvious that the principles of operation which govern this machine, although specifically described in connection with the checkering of gun stocks, are equally applicable to the production of patterns of intersecting lines at any angle and on any other articles. It will likewise be obvious that although certain angular relationships and modes of operation have been discussed, these items were mentioned purely by way of illustration and are not to be construed as limi-

We claim:

1. In a woodworking machine comprising a main frame, a work-holder adapted to engage a workpiece; an indexing frame having means to mount the work-holder for supporting the workpiece in one or more of a plurality of angularly related positions each equidistant from a predetermined reference plane; a traversing frame mounted on the main frame for reciprocation on a line parallel to said reference plane and having means thereon to support the indexing frame for movement along a line parallel to the reference plane and at an angle to the line of reciprocation of the traversing frame; means to impart successive reciprocating movements to the traversing frame; indexing means to impart an incremental movement of a uniform amount to the indexing frame for each cycle of reciprocation of the traversing frame; and cutter means mounted on the main frame and engageable with the workpiece during reciprocation of the traversing frame.

2. A woodworking machine comprising a main frame; a work-holder adapted to engage a workpiece; an indexing frame having means to mount the work-holder for supporting the workpiece in one or more of a plurality of angularly related positions each equidistant from a predetermined reference plane; a traversing frame mounted on the main frame for reciprocation along a line parallel to the reference plane and having means thereon to support the indexing frame for movement along a line parallel to the reference plane and at an angle to the line of reciprocation of the traversing frame; means to impart successive reciprocating movements to the traversing frame; indexing means to impart an incremental movement of a uniform amount to the indexing frame relative to the traversing frame for each cycle of reciprocation of the traversing frame; cutter means mounted on the main frame and engageable with the workpiece during reciprocation of the traversing frame; and means for controlling the engagement of said cutter means with said workpiece in accordance with a predetermined pattern.

3. A woodworking machine comprising a main frame; a traversing frame reciprocably mounted on the main frame; an indexing frame slidably mounted on the traversing frame for movement in a direction at an angle to the line of reciprocation of the traversing frame; a work-holder rotatably mounted on the indexing frame for rotation about an axis mutually perpendicular to the lines of movement of the traversing frame and of the indexing frame whereby a workpiece held in said work-holder may be traversed, indexed, or rotated in a predetermined plane; locking means to secure the work-holder in angularly separated positions; traversing means to impart successive reciprocating movements to the traversing frame; indexing means to impart successive incremental movements to the indexing frame; cutter means mounted on the main frame for movement into engagement with a workpiece held in said work-holder; a pattern control template mounted in fixed relation to said work-holder and substantially duplicating the movement thereof; a pattern follower mounted on the frame and engageable with the template; and means controlled by the pattern follower to control the engagement of said cutter means with said workpiece.

4. A woodworking machine comprising a main frame; a traversing frame reciprocably mounted on the main frame; an indexing frame mounted on the traversing frame for sliding movement along a path at an angle to the line of reciprocation of the traversing frame; a work-holder shaft journaled in the indexing frame for at least limited rotation about an axis mutually perpendicular to the line of movement of the traversing frame and of the indexing frame; locking means to secure the shaft in one or the other of two angularly separated positions; a work-holder mounted on the shaft adapted to hold a workpiece for traversing, indexing, or rotation within a predetermined plane; traversing means engaged between the main frame and the traversing frame to impart successive reciprocating movements to the traversing frame; screw means engaged between the traversing frame and the indexing frame to cause relative movement between said members; indexing means mounted on said main frame including ratchet and pawl mechanism operatively connected to said screw means and arranged for actuation to incrementally rotate said screw, said indexing means being reversible in character; a plate mounted on and rotatable with said shaft having reversing brackets mounted thereon; reversing means including plungers selectively engageable by one or the other of said brackets as a result of shifting the shaft between its angularly separated positions to reverse the indexing means; opposed cutter means mounted on the main frame and shiftable into engagement with the opposite sides of a workpiece held in said work-holder; spring means normally maintaining said cutters out of engagement with the workpiece; a template mounted on said plate having an area defining the desired pattern; a follower mounted on the main frame in engagement with the surface of the template; switch means actuated by the follower; and solenoid means in circuit with said switch means linked with said cutters to yieldingly urge them into workpiece engaging position when the switch has been closed by follower engagement with the area of the template defining the desired pattern, said cutters having guide means associated therewith engageable with the surface of a workpiece held in said work-holder to secure a pattern of substantially constant depth as said cutter means traverses non-planar surfaces of said workpiece.

5. A woodworking machine comprising a work-holder; means for indexing said work-holder in a desired direction, said indexing means comprising a screw; a pair of ratchet wheels having oppositely facing teeth operatively connected to rotate with the screw; a pawl carrier swingably associated with said ratchet wheels, said pawl carrier being subjected to periodic swinging movements; a compound pawl pivotally mounted on the pawl carrier, said compound pawl having means adapted to alternatively engage one or the other of the ratchet wheels in driving engagement; a pawl shifting lever swingably mounted on the pawl carrier in engagement with the pawl and adapted to shift it between its alternative positions; spring means engaged between the pawl carrier and the shifting lever, said spring means having an over-center action whereby the lever is yieldingly retained in one or the other of its two positions; a shifting projection on said shifting lever and a shifting sector having abutments selectively positionable in opposition to said projection in accordance with a desired direction of indexing, said abutments being operable through the projection on said shifting lever to move said lever to a position corresponding to the desired indexing direction.

6. In a woodworking machine adapted to support a workpiece for movement in a predetermined plane, a pair of cutters; a pair of brackets mounted for rotation about a common axis, each engaging one of said cutters to carry said cutter for movement relative to the predetermined plane; an abutment on each of said brackets; a pair of control members pivotally mounted for rotation about said common axis, each control member having an arm engageable with the abutment on its respective bracket; separate resilient means engaged between each bracket and its respective control member arm tending to retain the abutment in engagement with the control member arm; means interlinking the control members for simultaneous movement of said cutters toward or away from the predetermined plane; spring means tending to move both control members in a direction away from said plane; and cutter feed means energizable to move both of said control members in a direction toward said plane.

7. In a woodworking machine in combination, a workholder; a workholder mounting including an indexing frame on which said workholder may be rotated about an axis perpendicular to a predetermined reference plane between a plurality of angularly spaced positions; and a traversing frame mounted in said machine for reciprocation along a line parallel to said plane and provided with means to support said indexing frame for incremental movement along a line parallel to said plane and at an angle to said line of reciprocation of the traversing frame; means to releaseably secure the workholder in one or more of said angularly spaced positions; cutter means operatively related to said workholder positionable to engage the surface of a workpiece secured therein; means for repetitively reciprocating said traversing frame; and means for indexing said indexing frame by a predetermined increment for each traversing movement both of said last mentioned means being operative in each of a plurality of said angularly spaced positions whereby the cutter means may cut on a workpiece held in said workholder a plurality of series of angularly related grooves.

8. In a woodworking machine in combination, a workholder; a workholder mounting including an indexing frame on which said workholder may be rotated about an axis perpendicular to a predetermined reference plane between a plurality of angularly spaced positions, and a traversing frame mounted in said machine for reciprocation along a line parallel to said plane and provided with means to support said indexing frame for incremental movement along a line parallel to said plane and at an angle to said line of reciprocation of the traversing frame; means to releaseably secure the workholder in one or more of said angularly spaced positions; cutter means operatively related to said workholder positionable to engage the surface of a workpiece secured therein; means for repetitively reciprocating said traversing frame; means for indexing said indexing frame by a predetermined increment for each traversing movement, both of said last mentioned means being operative in a plurality of said angularly spaced positions whereby said cutter means may cut on a workpiece secured in said workholder a plurality of series of angularly related grooves; and cutter control means for limiting the length of said grooves to define a predetermined pattern.

9. In a woodworking machine in combination, a workholder; a workholder mounting including an indexing frame on which said workholder may be rotated about an axis perpendicular to a predetermined reference plane between a plurality of angularly spaced positions, and a traversing frame mounted in said machine for reciprocation along a line parallel to said plane and provided with means to support said indexing frame for incremental movement along a line parallel to said plane and at an angle to said line of reciprocation of the traversing frame; means to releaseably secure the workholder in one or more of said angularly spaced positions; duplex cutter means operatively related to opposite sides of said workholder and positionable to engage opposite surfaces of a workpiece secured therein; means for repetitively reciprocating said traversing frame; and means for indexing said indexing frame by a predetermined increment for each traversing movement, both of said last mentioned means being operative in each of a plurality of said angularly spaced positions whereby said cutter means may simultaneously cut on opposite sides of a workpiece secured in said workholder an identical pattern comprising a plurality of series of angularly related grooves.

10. In a woodworking machine in combination, a workholder; a workholder mounting including an indexing frame on which said workholder may be rotated about an axis perpendicular to a predetermined reference plane between a plurality of angularly spaced positions, and a traversing frame mounted in said machine for reciprocation along a line parallel to said plane and provided with means to support said indexing frame for incremental movement along a line parallel to said plane and at an angle to said line of reciprocation of the traversing frame; means to releaseably secure the workholder in one or more of said angularly spaced positions; cutter means operatively associated with the workholder and positionable to engage the surface of a workpiece secured therein; means for repetitively reciprocating said traversing frame; means for indexing said indexing frame by a predetermined increment for each traversing movement, said last mentioned means being operative in each of a plurality of said angularly spaced positions whereby said cutter means may cut on a workpiece secured in said workholder a plurality of series of angularly related grooves; and guide means associated with the cutter means engageable with the surface of a workpiece in said workholder to secure cuts of substantially constant depth even though the surface of the workpiece is not planar.

11. In a woodworking machine in combination, a workholder; a workholder mounting including an indexing frame on which said workholder may be rotated about an axis perpendicular to a predetermined reference plane between a plurality of angularly spaced positions, and a traversing frame mounted in said machine for reciprocation along a line parallel to said plane and provided with means to support said indexing frame for incremental movement along a line parallel to said plane and at an angle to said line of reciprocation of the traversing frame; means to releaseably secure the workholder in one or more of said angularly related positions; cutter means operatively associated with the workholder positionable to engage the surface of a workpiece secured therein; means for repetitively reciprocating said traversing frame; means for indexing said indexing frame by a predetermined increment for each traversing movement, both of said last mentioned means being operative in each of a plurality of said angularly spaced positions whereby the cutter means may cut on the surface of a workpiece in said workholder a pattern comprising a plurality of series of spaced angularly related grooves; guide means associated with the cutter means engageable with the surface of workpiece in said workholder to secure cuts therein of substantially constant depth even though the surface of the workpiece is not planar; and cutter control means for limiting the length of said grooves to that defining a predetermined pattern.

12. In a woodworking machine having a frame; a workholder mounted on said frame to support a workpiece for movement confined to a predetermined plane; a tool bracket mounted for rotation about an axis on said machine frame parallel to said plane; a cutting tool mounted on said bracket for swinging movement relative to the predetermined plane as said bracket is rotated about said axis; an abutment on said bracket; a tool control member mounted for rotation about said axis; an arm of the control member engageable with said abutment on the side toward which said bracket must swing to bring the cutter nearer said plane, said control member moving the cutter away from said plane when said arm is moved toward the abutment and permitting said cutter to move toward the plane when the arm is moved away from said abutment; yieldable means acting on the bracket urging said abutment into engagement with the arm; spring means engaged between said control member and the machine frame tending to rotate the control member about said axis in a direction to bring the arm thereon toward said abutment; and cutter feed means mounted on said machine frame and interlinked with the control member, said feed means being energizable to rotate the control member about said axis in a direction tending to separate the arm from said abutment.

ELLIS W. HAILSTON.
CLIFFORD F. CASEY.
GEORGE R. MELICK.

REFERENCES CITED

The following references are of record in the file of this patent:

UNITED STATES PATENTS

| Number | Name | Date |
|---|---|---|
| 47,315 | McGill | Apr. 18, 1865 |
| 452,085 | Sheen | May 12, 1891 |
| 553,393 | Charrier | Jan. 21, 1896 |
| 692,028 | Page | Jan. 28, 1902 |
| 1,900,203 | Seiler | Mar. 7, 1933 |
| 1,966,869 | Owen | July 17, 1934 |
| 2,096,339 | Reeves | Oct. 19, 1937 |
| 2,161,054 | Jepson | June 6, 1939 |
| 2,191,764 | Leon | Feb. 27, 1940 |
| 2,193,864 | Fidler et al. | Mar. 19, 1940 |
| 2,367,850 | Dusevoir | Jan. 23, 1945 |